US010049482B2

United States Patent
Corazza et al.

(10) Patent No.: US 10,049,482 B2
(45) Date of Patent: Aug. 14, 2018

(54) SYSTEMS AND METHODS FOR ANIMATION RECOMMENDATIONS

(75) Inventors: Stefano Corazza, San Francisco, CA (US); Emiliano Gambaretto, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 608 days.

(21) Appl. No.: 13/555,548

(22) Filed: Jul. 23, 2012

(65) Prior Publication Data

US 2013/0021348 A1 Jan. 24, 2013

Related U.S. Application Data

(60) Provisional application No. 61/510,679, filed on Jul. 22, 2011.

(51) Int. Cl.
*G06T 13/00* (2011.01)
*G06T 13/40* (2011.01)

(52) U.S. Cl.
CPC .......... *G06T 13/40* (2013.01); *G06T 2200/16* (2013.01)

(58) Field of Classification Search
CPC ......... G06T 13/20–13/60; G06T 17/00–17/30; G06T 19/20
USPC .................................................. 345/473–475
See application file for complete search history.

(56) References Cited

U.S. PATENT DOCUMENTS

| 6,047,078 A | 4/2000 | Kang |
| 6,088,042 A | 7/2000 | Handelman et al. |
| 6,203,425 B1 * | 3/2001 | Hayashi ............ G06T 13/40 345/427 |
| 6,278,466 B1 | 8/2001 | Chen |
| 6,552,729 B1 | 4/2003 | Di Bernardo et al. |
| 6,554,706 B2 | 4/2003 | Kim et al. |
| 6,700,586 B1 | 3/2004 | Demers |
| 6,714,200 B1 | 3/2004 | Talnykin et al. |

(Continued)

FOREIGN PATENT DOCUMENTS

| EP | 1884896 A2 | 2/2008 |
| WO | 2007132451 A2 | 11/2007 |

(Continued)

OTHER PUBLICATIONS

Zordan et al., Dynamic Response for Motion Capture Animation, ACM Transactions on Graphics—Proceedings of ACM SIGGRAPH 2005, vol. 24, Issue 3, Jul. 2005, pp. 697-701.*

(Continued)

*Primary Examiner* — Charles Tseng
(74) *Attorney, Agent, or Firm* — Keller Jolley Preece (57) ABSTRACT

Systems and methods for generating recommendations for animations to apply to animate 3D characters in accordance with embodiments of the invention are disclosed. One embodiment includes an animation server and a database containing metadata describing a plurality of animations and the compatibility of ordered pairs of the described animations. In addition, the animation server is configured to receive requests for animation recommendations identifying a first animation, generate a recommendation of at least one animation described in the database based upon the first animation, receive a selection of an animation described in the database, and concatenate at least the first animation and the selected animation.

20 Claims, 3 Drawing Sheets

(56) References Cited

U.S. PATENT DOCUMENTS

| | | |
|---|---|---|
| 7,149,330 B2 | 12/2006 | Liu et al. |
| 7,168,953 B1 | 1/2007 | Poggio et al. |
| 7,209,139 B1 | 4/2007 | Keet et al. |
| 7,372,536 B2 * | 5/2008 | Shah et al. .............. 352/87 |
| 7,522,165 B2 | 4/2009 | Weaver |
| 7,937,253 B2 | 5/2011 | Anast et al. |
| 8,390,628 B2 | 3/2013 | Harding et al. |
| 8,744,121 B2 | 6/2014 | Polzin et al. |
| 8,749,556 B2 | 6/2014 | de Aguiar et al. |
| 8,797,328 B2 | 8/2014 | Corazza et al. |
| 8,928,672 B2 | 1/2015 | Corazza et al. |
| 8,982,122 B2 | 3/2015 | Corazza et al. |
| 2002/0050988 A1 | 5/2002 | Petrov et al. |
| 2003/0164829 A1 | 9/2003 | Bregler et al. |
| 2003/0169907 A1 | 9/2003 | Edwards et al. |
| 2003/0208116 A1 | 11/2003 | Liang et al. |
| 2003/0215130 A1 | 11/2003 | Nakamura et al. |
| 2004/0021660 A1 | 2/2004 | Ng-Thow-Hing et al. |
| 2004/0049309 A1 | 3/2004 | Gardner et al. |
| 2004/0210427 A1 | 10/2004 | Marschner et al. |
| 2004/0227752 A1 | 11/2004 | McCartha et al. |
| 2005/0264572 A1 | 12/2005 | Anast et al. |
| 2006/0002631 A1 | 1/2006 | Fu et al. |
| 2006/0109274 A1 | 5/2006 | Alvarez et al. |
| 2006/0134585 A1 | 6/2006 | Adamo-Villani et al. |
| 2006/0171590 A1 | 8/2006 | Lu et al. |
| 2006/0245618 A1 | 11/2006 | Boregowda et al. |
| 2006/0267978 A1 | 11/2006 | Litke et al. |
| 2007/0091085 A1 | 4/2007 | Wang et al. |
| 2007/0104351 A1 | 5/2007 | Yang et al. |
| 2007/0182736 A1 | 8/2007 | Weaver |
| 2008/0024487 A1 | 1/2008 | Isner et al. |
| 2008/0030497 A1 | 2/2008 | Hu et al. |
| 2008/0031512 A1 | 2/2008 | Mundermann et al. |
| 2008/0043021 A1 | 2/2008 | Huang et al. |
| 2008/0152213 A1 | 6/2008 | Medioni et al. |
| 2008/0158224 A1 | 7/2008 | Wong et al. |
| 2008/0170077 A1 | 7/2008 | Sullivan et al. |
| 2008/0170078 A1 | 7/2008 | Sullivan et al. |
| 2008/0180448 A1 | 7/2008 | Anguelov et al. |
| 2008/0187246 A1 | 8/2008 | Andres del Valle |
| 2008/0252596 A1 | 10/2008 | Bell et al. |
| 2008/0284779 A1 | 11/2008 | Gu et al. |
| 2009/0027337 A1 | 1/2009 | Hildreth |
| 2009/0067730 A1 | 3/2009 | Schneiderman |
| 2009/0195544 A1 | 8/2009 | Wrinch |
| 2009/0196466 A1 | 8/2009 | Capata et al. |
| 2009/0202114 A1 | 8/2009 | Morin et al. |
| 2009/0231347 A1 | 9/2009 | Omote |
| 2010/0007665 A1 | 1/2010 | Smith et al. |
| 2010/0020073 A1 | 1/2010 | Corazza et al. |
| 2010/0073361 A1 | 3/2010 | Taylor et al. |
| 2010/0134490 A1 | 6/2010 | Corazza et al. |
| 2010/0141662 A1 | 6/2010 | Storey et al. |
| 2010/0149179 A1 | 6/2010 | Aguiar et al. |
| 2010/0238182 A1 | 9/2010 | Geisner et al. |
| 2010/0253703 A1 | 10/2010 | Ostermann |
| 2010/0259547 A1 | 10/2010 | De Aguiar et al. |
| 2010/0278405 A1 | 11/2010 | Kakadiaris et al. |
| 2010/0285877 A1 | 11/2010 | Corazza |
| 2011/0292034 A1 | 12/2011 | Corazza et al. |
| 2012/0019517 A1 | 1/2012 | Corazza et al. |
| 2012/0038628 A1 | 2/2012 | Corazza et al. |
| 2012/0130717 A1 | 5/2012 | Xu et al. |
| 2012/0327091 A1 | 12/2012 | Eronen et al. |
| 2013/0021348 A1 | 1/2013 | Corazza et al. |
| 2013/0100140 A1 | 4/2013 | Ye et al. |
| 2013/0127853 A1 | 5/2013 | Corazza et al. |
| 2013/0215113 A1 | 8/2013 | Corazza et al. |
| 2013/0235045 A1 | 9/2013 | Corazza et al. |
| 2014/0035934 A1 | 2/2014 | Du et al. |
| 2014/0160116 A1 | 6/2014 | de Aguiar et al. |
| 2014/0204084 A1 | 7/2014 | Corazza et al. |
| 2014/0285496 A1 | 9/2014 | de Aguiar et al. |
| 2014/0313192 A1 | 10/2014 | Corazza et al. |
| 2014/0313207 A1 | 10/2014 | Taylor et al. |

FOREIGN PATENT DOCUMENTS

| | | |
|---|---|---|
| WO | 2009007701 A1 | 1/2009 |
| WO | 2010060113 A1 | 5/2010 |
| WO | 2010129721 A2 | 11/2010 |
| WO | 2010129721 A3 | 6/2011 |
| WO | 2011123802 A1 | 10/2011 |
| WO | 2012012753 A1 | 1/2012 |

OTHER PUBLICATIONS

Liu et al., 3D Motion Retrieval with Motion Index Tree, Computer Vision and Image Understanding, vol. 92, Issues 2-3, Nov.-Dec. 2003, pp. 265-284.*

Arikan et al., Motion Synthesis from Annotations, ACM Transactions on Graphics—Proceedings of ACM SIGGRAPH 2003, vol. 22, Issue 3, Jul. 2003, pp. 402-408, available at http://citeseerx.ist.psu.edu/viewdoc/download?doi=10.1.1.85.4452&rep=rep1&type=pdf.*

Davis et al., "Filing Holes in Complex Surfaces Using Volumetric Diffusion", Proc. First Symposium on 3D Data Processing, Visualization, and Transmission, 2002, pp. 1-11.

De Aguiar et al., "Marker-Less 3D Feature Tracking for Mesh-Based Human Motion Caption", Human Motion 2007, LNCS 4818, 2007, 1-15.

Di Bernardo et al., "Generating Realistic Human Motions from Observations", submitted to Fifth European Conf. on Computer Vision, ECCV 1998, pp. 1-12.

Gao et al., "Motion normalization: the Preprocess of Motion Data", 2005, pp. 253-256.

Garland et al., "Surface Simplification Using Quadric Error Metrics", Proceedings of SIGGRAPH 1997, pp. 209-216, 1997.

Goncalves et al., Reach Out and Touch Space (Motion Learning), Automatic Face and Gesture Recognition, 1998, Proceedings. Third IEEE International Conference on Apr. 14-16, 1998, pp. 234-239.

Hahnel et al., "An Extension of the ICP Algorithm for Modeling Nonrigid Objects with Mobile Robots", Proceedings of the International Joint Conference on Artificial Intelligence (IJCAI), 2003, 6pgs.

Hilton et al., "From 3D Shape Capture to Animated Models", First International Symposium on 3D Processing, Visualization and Transmission (3DVPT2002), 2002.

Ju, et al., "Reusable Skinning Templates Using Cage-based Deformations", ACM Transactions on Graphics (TOG)—Proceedings of ACM SIGGRAPH Asia 2008, vol. 27 Issue 5, Dec. 2008, 10 pages.

Kahler et al., "Head Shop: Generating Animated Head Models with Anatomical Structure", ACM SIGGRAPH Symposium on Computer Animation, pp. 55-64, 2002.

Lewis, "H.264/MPEG-4 AVC CABAC overview", http://www.theonlineoasis.co.uk/notes.html, Dec. 3, 2012.

Lewis et al., "Pose Space Deformation: A Unified Approach to Shape Interpolation and Skeleton-Drive Deformation", Proceedings of ACM SIGGRAPH 2000, pp. 165-172, 2000.

Liepa, P., "Filing Holes in Meshes", Proc. of the Eurographics/ACM SIGGRAPH Symposium on Geometry Processing, pp. 200-205, 2003.

Ma et al., "An Invitation to 3D Vision", Springer Verlag, pp. 15-28, 2004.

Mamou et al., "Temporal DCT-based compression of 3D Dynamic Meshes", ICCOM'06 Proceedings of the 10th WSEAS international conference on Communications, Jul. 10-12, 2006, 74-79.

Mamou et al., "The New MPEG-4/FAMC Standard for Animated 3D Mesh Compression", IEEE 3DTV-CON'08, May 2008.

Max Planck Institut Informatik, "Automatic Conversion of Mesh Animations into Skeleton-based Animations", http://www.mpiinf.mpg.de/-edeaguia/animation_eg08.html; Mar. 30, 2008, 9pgs.

Mohr et al., "Building Efficient, Accurate Character Skins from Examples", ACM Transactions on Graphics, 22(3), pp. 562-568, 2003.

(56) References Cited

OTHER PUBLICATIONS

Noh et al., "Expression Cloning", Proceedings of ACM SIGGRAPH 2001, pp. 277-288, 2001.
Okada, R. et al., "A Video Motion Capture System for Interactive Games.", MVA2007 IAPR Conference on Machine Vision Applications, Tokyo, Japan, May 16-8, 2007, 4 pgs.
Park et al., "On-line locomotion generation based on motion blending", ACM SIGGRAPH Symposium on Computer Animation. San Antonio, Jul. 21, 2002, 8 pages.
Park et al., "On-line motion blending for real-time locomotion generation", Computer Animation & Virtual Worlds. Wiley, UK, vol. 15, No. 3-4, Jul. 2004, 14 pages.
Popovic et al., "Style-Based Inverse Kinematics", ACM Transactions on Graphics, 23(3), pp. 522-531, 2004.
Safonova et al., "Construction and optimal search of interpolated motion graphs", ACM SIGGRAPH, 2007, 11 pgs.
Sand et al., "Continuous Capture of Skin Deformation", ACM Transactions on Graphics, 22(3), pp. 578-586, 2003.
Scholkopf et al., "A Tutorial on support Vector Regression", In Technical Report NC2-TR-1998-030. NeuroCOLT2, Oct. 1998.
Seo et al., "An Automatic Modeling of Human Bodies from Sizing Parameters", In Symposium on Interactive 3D Graphics, 2003, pp. 19-26.
Sloan et al., "Shape by Example", In 2001 Symposium on Interactive 3D Graphics, pp. 135-144, 2001.
Smola et al., "A Tutorial on Support Vector Regression", Statistics and Computing London 14(3) pp. 199-222, 2004.
Sumner et al., "Deformation Transfer for Triangle Meshes", Proceedings of ACM SIGGRAPH 2004, 23(3), pp. 399-405, 2004.
Szliski et al., "Matching 3D Anatomical Surfaces with Non-rigid Deformations Using Octree-Splines", International Journal of Computer Vision, 1996, 18,2, pp. 171-186.
Tao, Ju et al., "Mean Value Coordinates for Closed Triangular Meshes", Proceedings of ACM SIGGRAPH (2005), 6 pgs.
Taylor et al., "Modeling Human Motion Using Binary Latent Variables", Proc. of Advances in Neural Information Processing Systems (NIPS) 19, 8 pgs, 2006.
Tung et al., "Topology Matching for 3D Video Compression Computer Vision and Pattern Recognition", IEEE Conference Computer Vision and Pattern Recognition, 2007, Jun. 2007, 8 pgs.
Vasilescu et al., "Multilinear Analysis of Image Ensembles: Tensorfaces", European Conference on Computer Vision (ECCV), pp. 447-460, 2002.
Vlasic et al., "Face Transfer with Multilinear Models", ACM Transactions on Graphics 24(3), pp. 426-433, 2005.
Vlasic et al., "Multilinear Models for Facial Synthesis", SIGGRAPH Research Sketch, 2004.
Von Luxburg, "A Tutorial on Spectral Clustering. Statistics and Computing", 2007, 32 pgs.
Wang et al., "Multi-weight Enveloping: Least Squares Approximation Techniques for Skin Animation", ACM SIGGRAPH Symposium on Computer Animation, pp. 129-138, 2002.
Zhidong et al., "Control of motion in character animation", Jul. 14, 2004, 841-848.
International Search Report for International Application No. PCT/US 09/57155, date completed Dec. 22, 2009, dated Jan. 12, 2010, 5 pgs.
International Search Report for International Application No. PCT/US 09/65825, date completed Jan. 21, 2010, dated Jan. 28, 2010, 3 pgs.
International Search Report for International Application PCT/US2011/045060, completed Nov. 27, 2011, 2 pgs.
International Search Report for PCT/US2010/033797, filed May 5, 2010, report completed Jun. 11, 2010, 2 pgs.
Written Opinion of the International Searching Authority for International Application No. PCT/US 09/57155, date completed Dec. 22, 2009, dated Jan. 12, 2010, 6 pgs.
Written Opinion of the International Searching Authority for International Application No. PCT/US 09/65825, date completed Jan. 21, 2010, dated Jan. 28, 2010, 6 pgs.
Written Opinion of the International Searching Authority for International Application No. PCT/US2010/033797, filed May 5, 2010, completed Jun. 11, 2010, 4 pgs.
Written Opinion of the International Searching Authority for International Application No. PCT/US2011/045060, completed Nov. 27, 2011, 5 pgs.
Aguiar, E. De et al., "Automatic Conversion of Mesh Animations into Skeleton-based Animations", EUROGRAPHICS 2008, vol. 27, No. 2, Apr. 2008.
Anguelov et al., "Recovering Articulated Object Models from 3D Range Data", In Proceedings of the 20th Conference on Uncertainty in Artificial Intelligence, UAI 2004, 18-26.
Anguelov et al., "SCAPE: Shape Completion and Animation of People", Proceedings of the SIGGRAPH Conference, 2005.
Anguelov et al., "The Correlated Correspondence Algorithm for Unsupervised Registration of Nonrigid Surfaces", Advance in Neural Information Processing Systems, 17, 2004, pp. 33-40.
Baran et al, "Automatic rigging and animation of 3D characters", ACM Transactions on Graphics (TOG)—Proceedings of ACM SIGGRAPH 2007, vol. 26, Issue 3, Jul. 2007.
Beaudoin, et al., "Adapting Wavelet Compression to Human Motion Capture Clips", GI '07 Proceedings of Graphics Interface, 2007, 6 pages.
Blanz et al., "A Morphable Model for the Synthesis of 3D Faces", In Proceedings of ACM SIGGRAPH 1999, 8 pgs, 1999.
Bray, Joseph, "Markerless Based Human Motion Capture: A Survey", Published 2001, 44 pgs.
Buenaposada et al., "Performance Driven Facial Animation Using Illumination Independent Appearance-Based Tracking", In Proceedings of ICPR, Hong Kong, Aug. 2006, 4 pgs.
Cheung et al., "Shape-from Silhouette of Articulated Objects and its use for Human Body Kinematics Estimation and Motion Capture", In Conference on Computer Vision and Pattern Recognition (CVPR), pp. 77-84, 2003.
Curio et al., "Semantic 3D Motion Retargeting for Facial Animation", ACM 2006, 8 pgs.
Curless et al., Allen, "The Space of Human Body Shapes: Reconstruction and Parameterization from Range Scans", ACM Transactions on Graphics, 22(3), pp. 587-594, 2003.
Curless et al., "A Volumetric Method of Building Complex Models from Range Images", Retrieved from http://graphics.stanford.edu/papers/volrange/volrange.pdf, pp. 1-10, 1996.
Curless et al., Allen, "Articulated Body Deformation from Range Scan Data", ACM Transactions on Graphics, 21(3), 612-619, 2002.
Wikipedia, "Morph target animation", Last Modified Aug. 1, 2014, Printed Jan. 16, 2015, 3 pgs.
Blanz, Volker et al., "Reanimating faces in images and video", Computer graphics forum, vol. 22, No. 3, Blackwell Publishing, Inc., 2003, 10 pgs.
Jones, Michael et al., "Fast multi-view face detection", Mitsubishi Electric Research Lab TR-20003-96 3: 14, 2003, 11 pgs.
Persson, Per, "ExMS: an Animated and Avatar-Based Messaging System for Expressive Peer Communication", Proceedings of the 2003 international ACM SIGGROUP conference on Supporting group work. ACM, 2003, 9 pgs.
Seitz, Steven M. et al., "A Comparison and Evaluation of Multi-View Stereo Reconstruction Algorithms", Computer Vision and Pattern Recognition, IEEE Computer Society Conference on vol. 1, 2006, 8 pgs.
Weise, Thibaut et al., "Realtime performance-based facial animation", ACM Transactions on Graphics (TOG) 30.4: 77, 2011, 9 pgs.
U.S. Appl. No. 13/097,031, filed Mar. 14, 2014, Office Action.
U.S. Appl. No. 13/097,031, filed Sep. 29, 2014, Notice of Allowance.

* cited by examiner

FIG. 3

SYSTEMS AND METHODS FOR ANIMATION RECOMMENDATIONS

CROSS-REFERENCE TO RELATED APPLICATIONS

This application claims priority to U.S. Provisional Application No. 61/510,679 filed Jul. 22, 2011, titled "Recommendation System for Real-Time Generation of Character Animation", the disclosure of which is incorporated herein by reference in its entirety.

FIELD OF THE INVENTION

The present invention relates generally to computer generated graphics and more specifically to computer generated recommendations for animations.

BACKGROUND

The creation of computer generated 3D content is becoming popular. Computer generated 3D content typically includes one or more animations. A 3D character can be specified using a mesh of vertices and polygons that define the shape of an object in 3D. The 3D character can also have a texture applied to the mesh that defines the appearance of the mesh. 3D characters used for animations can also include a skeleton that defines the articulated body parts of the mesh as well as skinning weights that define the deformation of a mesh as a function of the motion of a skeleton. The process of defining a skeleton and skinning weights is often referred to as rigging a 3D character. The animation of a rigged 3D character involves applying motion data to the character's skeleton to drive the character's mesh. The generation of animations can be technically challenging and is often performed by artists with specialized training.

SUMMARY OF THE INVENTION

Systems and methods in accordance with embodiments of the invention generate animation recommendations that can be concatenated to animate 3D characters. One embodiment includes an animation server and a database containing metadata describing a plurality of animations and the compatibility of ordered pairs of the described animations. In addition, the animation server is configured to receive requests for animation recommendations identifying a first animation, generate a recommendation of at least one animation described in the database based upon the first animation, receive a selection of an animation described in the database, and concatenate at least the first animation and the selected animation.

In a further embodiment, the metadata describing the compatibility of pairs of animations described in the database comprises a list of recommended animations with respect to a specific animation, and the animation server is configured to provide the list of recommended animations associated with the first animation in the database as the recommendation of at least one animation.

In another embodiment, the metadata describing the compatibility of a pair of animations comprises a compatibility score, and the animation server is configured to generate a recommendation of at least one animation using the compatibility scores of pairs of animations that include the first animation.

In a still further embodiment, the compatibility score is generated by comparing the similarity of the pose of a 3D character at the end of the first animation and the pose of the 3D character at the start of a second animation.

In still another embodiment, the similarity of the poses is determined using a weighted least squares comparison.

In a yet further embodiment, the weights are determined using a support vector machine.

In yet another embodiment, the metadata describing the compatibility of pairs of animations described in the database comprises a taxonomy tree, where each described animation is assigned to a node in the taxonomy tree and the proximity of nodes within the taxonomy tree is indicative of animation compatibility, and the application server is configured to generate a recommendation of at least one animation based upon the location of the first animation within the taxonomy tree.

In a further embodiment again, the animation server system is configured to identify at least one transition animation based upon the location of the first animation and the selected animation within the taxonomy tree, and the animation server is configured to concatenate the first animation, the at least one transition animation, and the selected animation.

In another embodiment again, the metadata describing the compatibility of a pair of animations comprises a compatibility score and a taxonomy tree, where each described animation is assigned to a category in the taxonomy tree and the proximity of categories within the taxonomy tree is indicative of animation compatibility, and the application server is configured to generate a recommendation of at least one animation based upon the location of the first animation within the taxonomy tree and the compatibility scores of pairs of animations that include the first animation.

In a further additional embodiment, the database contains the plurality of animations described by the metadata contained within the database.

In another additional embodiment, the animation server system is configured to generate the animations described in the database using motion models and high level descriptions of motion.

In a still yet further embodiment, the metadata describing the compatibility of a pair of animations identifies a motion model and a high level description of motion used to generate at least one of the animations in the pair of animations.

In still yet another embodiment, the animation server is configured to receive a 3D character model.

In a still further embodiment again, the animation server is configured to retarget the concatenated animations to the 3D character model.

In still another embodiment again, the animation server is configured to retarget animations to the 3D character model, and the animation server is configured to generate a recommendation of at least one retargeted animation described in the database based upon the compatibility of the first animation to the at least one retargeted animation.

In a still further additional embodiment, the animation server is configured to use inverse kinematics based on the metadata in the database describing the first animation and the selected animation to blend the first animation and the selected animation.

In still another additional embodiment, the metadata describing an animation comprises at least one piece of metadata selected from a group including: information about the start and end pose; the number of frames of the animation; the global orientation of the character in the first frame; the global orientation of the character in the last frame; whether the animation is in place or in motion; whether there is any foot planting in the animation; at least one frame in which a foot planting occurs; pose at the time of a foot planting; whether the animation ends on a floor level, a higher level, or a lower level than at the start of the animation; and whether the animation is in a seamless loop.

In a yet further embodiment again, at least one piece of metadata describing an animation is generated using a support vector machine.

Yet another embodiment again includes an animation server, and a database containing metadata including: metadata describing a plurality of animations; compatibility scores assigned to ordered pairs of the described animations; and a taxonomy tree, where each described animation is assigned to a category in the taxonomy tree and the proximity of categories within the taxonomy tree is indicative of animation compatibility. In addition, the animation server is configured to receive a 3D character model, the animation server is configured to receive requests for animation recommendations identifying a first animation, the animation server is configured to generate a recommendation of at least one animation described in the database based upon the location of the first animation within the taxonomy tree and the compatibility scores of pairs of animations that include the first animation, the animation server is configured to receive a selection of an animation described in the database, and the animation server is configured to concatenate at least the first animation and the selected animation and to retarget the concatenated animation to the 3D character model.

Another further embodiment of the method of the invention includes receiving a 3D character model at an animation server system, receiving a request for animation recommendations identifying a first animation at the animation server system, and generating a recommendation of at least one animation using the animation server system based upon the first animation using a database containing metadata including: metadata describing a plurality of animations; compatibility scores assigned to ordered pairs of the described animations; and a taxonomy tree, where each described animation is assigned to a category in the taxonomy tree and the proximity of categories within the taxonomy tree is indicative of animation compatibility. In addition, the method includes receiving a selection of an animation described in the database at the animation server system, concatenating at least the first animation and the selected animation using the animation server system, and retargeting the concatenated animation to the 3D character model using the animation server system.

DETAILED DESCRIPTION

Turning now to the drawings, systems and methods for generating recommendations for animations to apply to animate 3D characters in accordance with embodiments of the invention are illustrated. The term animation can be used to describe motion data that drives a 3D character mesh. In many embodiments, an animation server analyzes a 3D character and/or motion data used to animate the 3D character and makes recommendations with respect to animations that can be combined with existing motion data to create a sequence of animations. In several embodiments, an animation server maintains a database of animations searchable by metadata that describes the animations. In a number of embodiments, the metadata identifies compatibility between animations (i.e. whether a smooth animation sequence can be created by combining a first animation with a second animation). The animation server can use the metadata concerning compatibility between animations to generate recommendations concerning animations that can be combined with previously selected animations. In this way, sequences of animations can be constructed that smoothly transition from one animation to the next. In a number of embodiments, the metadata includes a taxonomy tree that defines the manner in which animations logically transition (e.g. lying down, standing up, standing, commencing walking, walking, jogging, running). The taxonomy tree can be utilized in generating recommendations and can be traversed to identify transition animations to insert between selected animations from the taxonomy tree to generate a more realistic sequence of animations.

In many embodiments, metadata concerning the compatibility of animations is generated by performing analysis of the animations including (but not limited to) analyzing the compatibility of the pose of a 3D character at the end of a first animation and the pose of the 3D character at the start of a second animation. In certain embodiments, metadata describing the compatibility of pairs of animations includes a score of the compatibility of the pairs of animations. In several embodiments, a support vector machine is trained to score the similarity of a pair of animations. In a number of embodiments, metadata describing each animation including (but not limited to) the classification of the animations (e.g. both animations involve a type of "walking" motion) is manually generated. These classifications can be utilized to place the animation within a taxonomy tree. The compatibility metadata and/or additional metadata can also be utilized to generate smooth transitions by blending selected animations and/or automatically inserting transition animations between selected animations in a sequence of animations based upon the location of the respective animations within a taxonomy tree.

In several embodiments, animations are synthetically generated using motion models and high level descriptions of the characteristics of the motion. For example, a motion model can provide the ability to control the characteristics of synthetically generated motion data including (but not limited to) the speed of the motion, the length of the stride, fatigue level and/or any other characteristic appropriate to a specific animation system. Although motion generated by motion models is synthetic, the motion models themselves can be generated using real world examples (e.g. motion data captured using motion capture). Systems and methods for generating synthetic motion data are described in U.S. patent application Ser. No. 12/370,269 entitled "Interactive Design, Synthesis and Delivery of 3D Character Motion Data Through the Web" and U.S. patent application Ser. No. 12/753,032 entitled "Web Platform for Interactive Design, Synthesis, and Delivery of 3D Character Motion Data", the disclosure of which is incorporated by reference herein in its entirety. In a number of embodiments, metadata describing the compatibility of animations identifies motion models that can produce motion data that is compatible with existing motion data used to animate a 3D character. In a number of embodiments, the metadata also describes the high level descriptions of the characteristics of the motion data generated using the motion models that will result in compatible motion data. In this way, metadata can be utilized to make specific recommendations concerning motion models and high level descriptions that can be utilized to generate compatible animations.

Systems and methods for generating sequences of 3D character animations using animation recommendations in accordance with embodiments of the invention are discussed further below.

Architectures for Animation Recommendation Systems

Animation servers in accordance with embodiments of the invention can maintain databases of animations and/or a number of motion models that can generate animations based upon high level descriptions of motion. Irrespective of whether the animations are stored in the database or generated using motion models, metadata can be stored in the databases describing the compatibility of various animation combinations. The metadata can then be used to make recommendations concerning animations that are compatible with previously selected/generated motion data. In many embodiments, the recommendations can be based upon compatibility scores assigned to specific ordered pairs of animations and/or based upon the position of the animations (or the categories to which the animations belong) within a taxonomy tree. Based upon the recommendations (or ignoring the recommendations), a user can select additional animations and the animation server can attempt to blend the existing motion data with the newly selected motion data to create smooth transitions. In several embodiments, a taxonomy tree is consulted to identify additional transition animations that can be inserted between the selected animations to create a more realistic sequence of animations.

Figure 1:
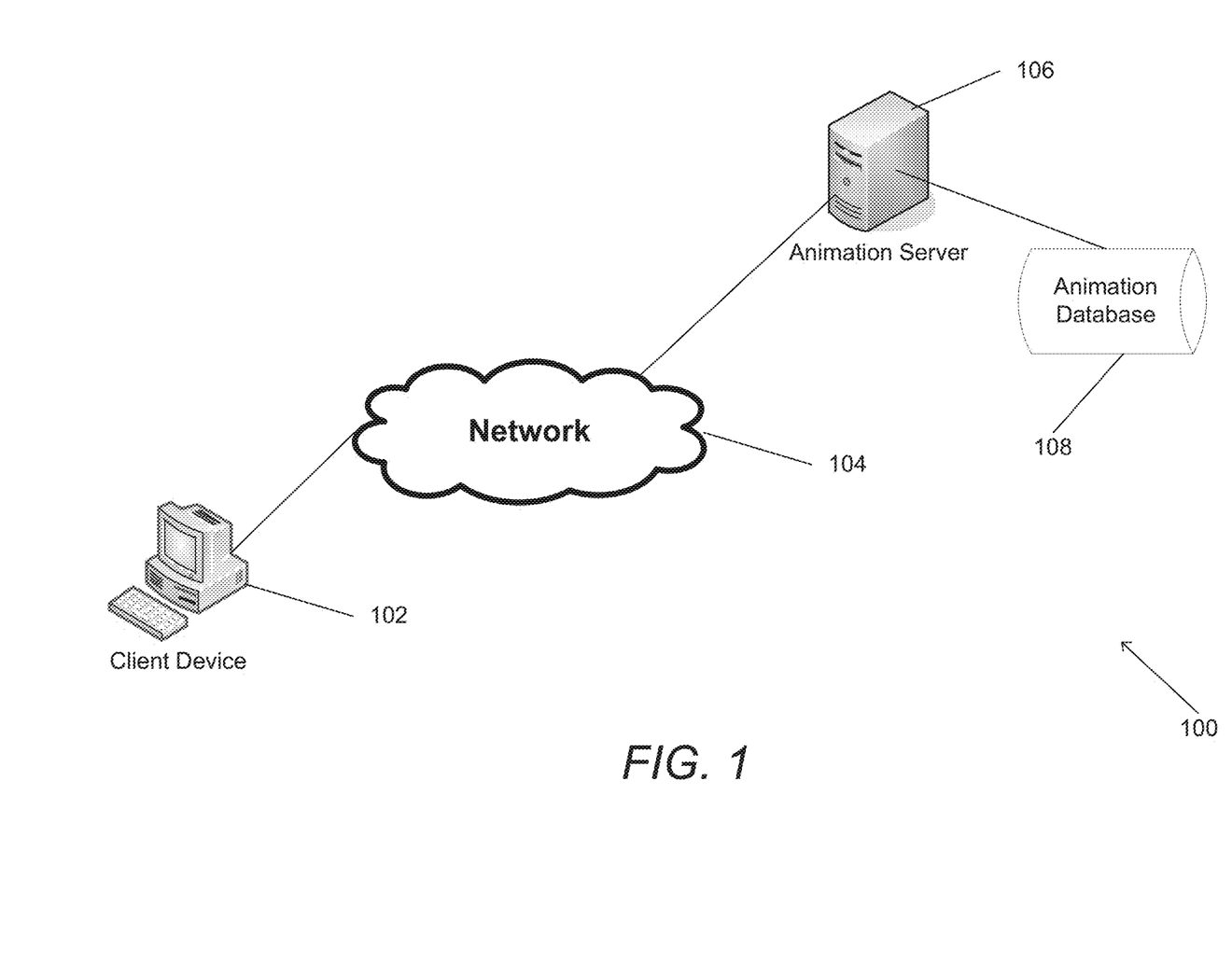
FIG. 1 illustrates a system for character animation recommendations in accordance with an embodiment of the invention.

A diagram of an animation system that can be used to construct sequences of animations to animate a 3D character using animation recommendations provided by an animation server in accordance with an embodiment of the invention is illustrated in FIG. 1. The animation system 100 includes a client device 102 configured to communicate with an animation server 106 via a network 104. In several embodiments, the network 104 is the Internet. The animation server 106 is configured by an animation application and maintains a database of animations 108 and associated metadata describing the animations and the compatibility of different combinations of animations from within the database. In a number of embodiments, the metadata includes a taxonomy tree describing the relationship between specific animations and/or categories of animations. In a number of embodiments the animation server 106 and the database 108 are part of an animation server system including one or more servers that perform various functions associated with generating sequences of animations. Although a database of animations is discussed below, a database of animations may not include motion data associated with animations and may simply include metadata describing a number of animations that can be combined in accordance with embodiments of the invention.

In many embodiments, the animation server 106 is configured to receive 3D characters from client devices 102. In several embodiments, the animation server 106 provides a user interface that a client device 102 can use to generate a 3D character. Systems and methods for generating 3D characters in accordance with embodiments of the invention are disclosed in U.S. patent application Ser. No. 13/071,764 entitled "Real Time Concurrent Design of Shape, Texture, and Motion for 3D Character Animation", the disclosure of which is hereby incorporated by reference in its entirety. The client device 102 can also be used to provide motion data to the animation server 106 and/or to select animations from the database of animations 108 via a user interface provided by the animation server.

In several embodiments, the animation server 106 is configured to generate synthetic motion data using one of a number of motion models that can generate animations based upon high level descriptions of motion. Where the animation server 106 can generate synthetic motion data, the animation server can maintain a database including metadata describing the motion models that can produce compatible motion data and/or the high level descriptions that can be utilized to generate compatible motion data. Metadata concerning compatible motion models and high level descriptions of motion data can be considered to be metadata concerning the compatibility of an animation and the animation generated by the motion model using a high level description. Accordingly, references to metadata describing the compatibility of animations is used throughout to encompass metadata that describes the compatibility of an animation with a stored animation, the compatibility of animation with an animation generated by a motion model and a high level description of motion, and/or the compatibility of an animation with a motion model and/or high level description of motion.

In certain embodiments, the metadata contained within the database of animations 108 classifies the animations and/or motion models. In many embodiments, classifications can include metadata identifying that an animation is part of a class of animations, such as (but not limited to) swimming, walking, running, combat, fight, attack, kick, or jump kick animations. In several embodiments, the metadata defines a taxonomy tree and the classification of an animation and/or motion model places it within the taxonomy tree. A taxonomy tree can be considered to be a set of nodes (e.g. animation categories), where each node includes a parent attribute identifying another node. In this way, a taxonomy tree can be utilized to define a hierarchy of related animations that can include transition animations. In a number of embodiments, traversing a taxonomy tree between any two animations within the tree can result in a smooth sequence of animations. In several embodiments, a taxonomy tree is defined for each animation and/or animation category with the relevant animation and/or animation category at the root of the taxonomy tree. The metadata can also include (but is not limited to) information about the start and end pose, the number of frames of the animation, the global orientation of the character in the first and last frame, whether the animation is in place or in motion, whether there is any foot planting in the animation and the frames and/or pose at the time of the foot planting, whether the animation ends on a floor level, a higher level, or a lower level than at the start, and whether the animation is in a seamless loop. In several embodiments, some or all of the above metadata can be determined or inferred from the data using techniques including (but not limited to) a support vector machine. Such metadata can be utilized in the scoring of the compatibility of animations and in the generation of transitions between animations (often referred to as concatenating animations). In several embodiments, the metadata includes information concerning the compatibility of animations. In certain embodiments, compatibility is identified using a list of recommended animations. In a number of embodiments, compatibility scores are assigned to ordered pairs of animations, animations and motion models, and/or animations and the combination of a motion model and a high level description of motion. The term ordered pair references that different compatibility scores can be assigned to a pair of animations depending upon the order in which the pair of animations animate a 3D character model. In other embodiments, any of a variety of categories of metadata can be included in the database describing the animations and/or the compatibility of animations as appropriate to the requirements of a specific application.

In several embodiments, the animation server 106 generates animation recommendations using metadata concerning the compatibility of animations contained within the database of animations 108. The animation server 106 can also use the metadata to generate smooth blends between selected animations. In a number of embodiments, inverse kinematics is used to improve the quality of blend leveraging information in the metadata contained within the database of animations. In a number of embodiments, the animation server uses metadata within the database of animations 108 such as (but not limited to) a taxonomy tree to identify and insert appropriate transition animations between animations selected by a client device 102 to create a smoother transition between the selected animations.

In many embodiments, the animation server 106 is configured to analyze combinations of animations to generate compatibility metadata that is stored in the database of animations 108. Compatibility metadata can be generated using a combination of manual and automated processes. Processes for generating compatibility metadata in accordance with embodiments of the invention are discussed further below. As additional compatibility metadata is added to the database of animations and users create sequences of animations, the recommendation process utilized by the animation server can be improved.

Although specific architectures for animation systems are discussed above with reference to FIG. 1, any of a variety of system architectures appropriate to the requirements of a specific application including a desktop computer implementation (as opposed to a client/server implementation) can be utilized in accordance with embodiments of the invention. Processes for generating compatibility metadata and animation recommendations in accordance with embodiments of the invention are discussed below.

Animation Recommendations

Figure 2:
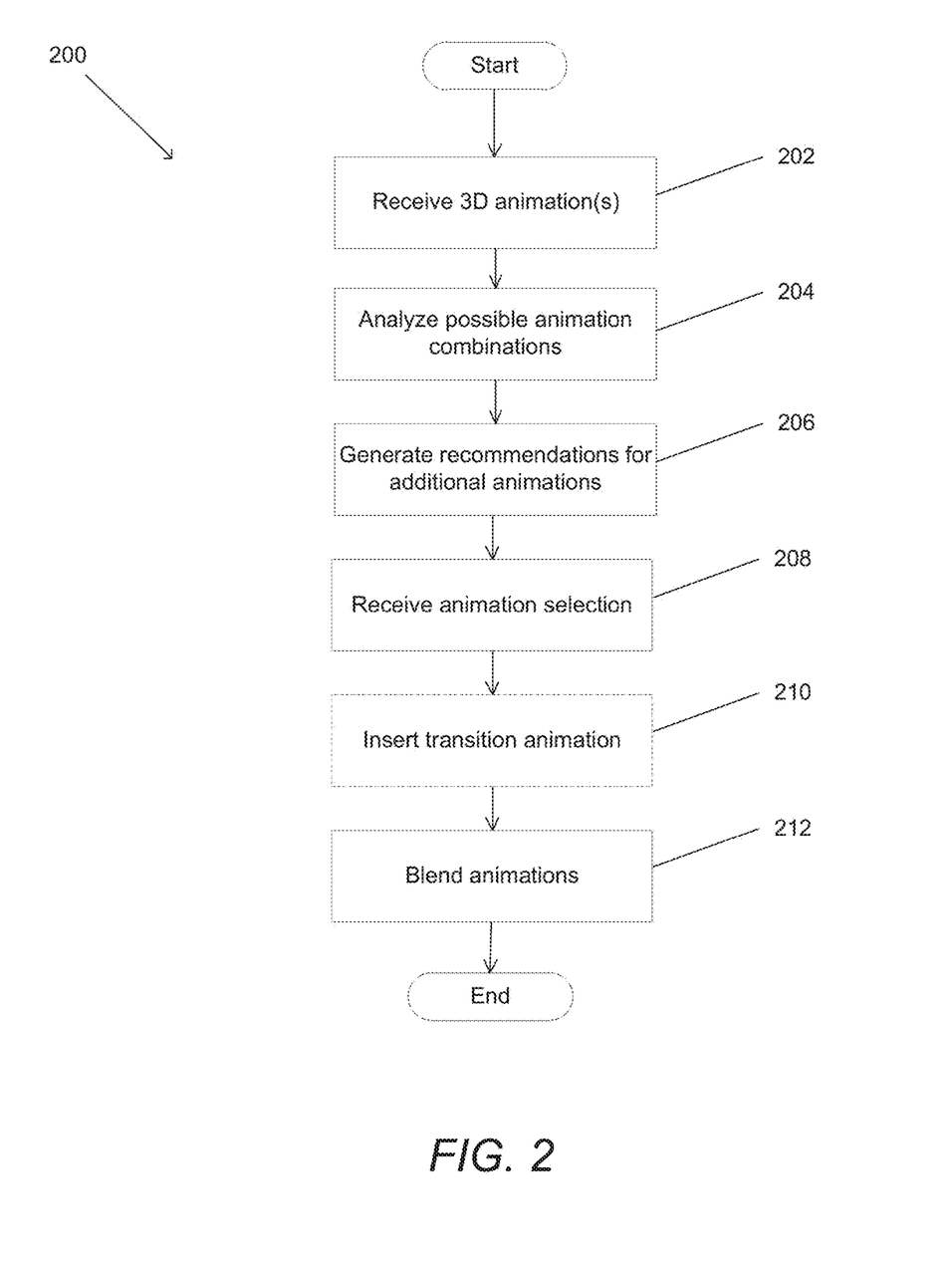
FIG. 2 is a flow chart illustrating a process for character animation recommendations in accordance with an embodiment of the invention.

Processes for recommending animations based upon previously selected animations in accordance with embodiments of the invention can involve utilizing metadata describing the compatibility of animations to recommend one or more animations. A process for recommending animations based upon previously selected animations in accordance with an embodiment of the invention is illustrated in FIG. 2. The process 200 includes receiving (202) a 3D character and one or more animations. Based upon the provided animation(s), possible animation combinations are analyzed (204) involving the combination of a received animation and an animation from a set of animations contained within a database of animations. Based upon the analysis, recommendations (206) for animations that can be appended before or after the received animations, or inserted between the received animations are generated. A user can select (208) one or more animations from the database of animations. Transitions between the received animations and a selected animation can then be generated. In a number of embodiments, metadata describing pose at the end and the beginning of an ordered pair of animations is used to generate a smooth blend (212) between the animations. In several embodiments, metadata such as (but not limited to) a taxonomy tree is used to make a decision concerning whether a transition animation can be utilized to make a smoother transition. In which case, a transition animation is selected using the metadata and inserted (210) between the pair of animations and the transitions between the three animations are blended (212).

In many embodiments, a 3D character and one or more animations are received (202) by an animation server from a client device. The client device can provide (202) a 3D character and select one or more animations from a database maintained by the animation server. In several embodiments, the client device can also be used to upload motion data to the animation server.

In various embodiments, recommendations for additional animations are generated (206) based upon the analysis of possible combined animations. In a number of embodiments, the analysis is previously performed and used to generate metadata describing and/or scoring possible combinations. In certain embodiments, the metadata includes lists of recommended animations. In many embodiments, the metadata includes a taxonomy tree identifying the similarity between specific animations. Animation recommendations can be presented as a set of additional animations that pass a certain threshold of compatibility as determined by a recommendation algorithm (such as whether combining a previously selected animation with an additional animation would be sufficiently realistic, or by any other appropriate metric). In a number of embodiments, recommended animations are presented in ranked order. In particular embodiments, the additional animations are given a score or other indication of suitability for combining with a previously selected animation. The scoring of animations in accordance with embodiments of the invention is discussed further below.

In a number of embodiments, the animation server enables a client device to control the characteristics of synthetic motion data generated using a selected motion model. Accordingly, different motion data can be generated using the same motion model based upon the high level descriptions used to generate the motion data. Therefore, the process of recommending animations can involve initially using metadata to identify one or more candidate motion models that are compatible with a previously selected animation and then comparing the specific pose of the 3D character at the end of the previously selected animation with the starting pose of motion data generated by the motion model (or vice versa). In a number of embodiments, the metadata identifies recommended animations by identifying and/or scoring motion models and associated high level descriptions used to generate synthetic motion data from the motion models. In this way, the animation system can identify high level descriptions that result in animations that are compatible with a previously selected animation and high level descriptions that generate animations that are incompatible with a previously selected animation.

When a user selects (208) animations, the animation server can attempt to blend (212) the animations. Processes for blending or concatenating animations are disclosed in U.S. patent application Ser. No. 13/097,031 entitled "Real-Time Automatic Concatenation of 3D Animation Sequences", the disclosure of which is incorporated herein by reference in its entirety. As noted in U.S. patent application Ser. No. 13/097,031 the process of concatenating two animations can involve the generation of an intermediate sequence or frame. In many embodiments, the metadata includes (but is not limited to) information about the start and end pose, the number of frames of the animation, the global orientation of the character in the first and last frame, whether the animation is in place, and whether the animation is in a seamless loop.

In several embodiments, the process can involve inserting (212) a transition animation into the sequence of animations to provide smoother transitions between less compatible animations (e.g. where a user selects a standing motion following a swimming motion, a transition animation in which a swimmer climbs out of a pool can be inserted to make a more lifelike transition). In a number of embodiments, the database of animations includes metadata that is utilized during the blending/concatenation of animations. In several embodiments, metadata including (but not limited to) a taxonomy tree can be utilized to identify transition animations that can be inserted between two selected animations to create a realistic sequence of animations.

Although specific processes for recommending animations are discussed above, any of a variety of processes for recommending animations can be utilized as appropriate to the requirements of a specific application in accordance with embodiments of the invention. Processes for analyzing the compatibility of ordered pairs of animations in accordance with embodiments of the invention are discussed below.

Analyzing the Compatibility of Ordered Pairs of Animations

The generation of metadata concerning the compatibility of animations can involve comparing the compatibility of motion data of specific animations and/or comparing the compatibility of specific categories of animation. Processes for determining the compatibility of pairs of animations in accordance with embodiments of the invention can involve use of a combination of manual and automated processes to score the compatibility of ordered pairs of animations. In several embodiments, the compatibility of motion data is scored by initially manually scoring the compatibility of ordered pairs of motion data and then using the manually scored ordered pairs of motion data to determine the weights of a support vector machine. In a number of embodiments, the support vector machine scores compatibility based upon a weighted least squares comparison of ordered pairs of animations. In many embodiments, compatibility can also be determined based upon the relationship between the ordered pair of animations within a taxonomy tree. Typically, a taxonomy tree is manually constructed and the categorization of animations within the taxonomy tree is also performed manually. In other embodiments, any of a variety of processes for placing animations within a taxonomy tree and/or determining the compatibility of animations can be utilized as appropriate to the requirements of a specific application.

Figure 3:
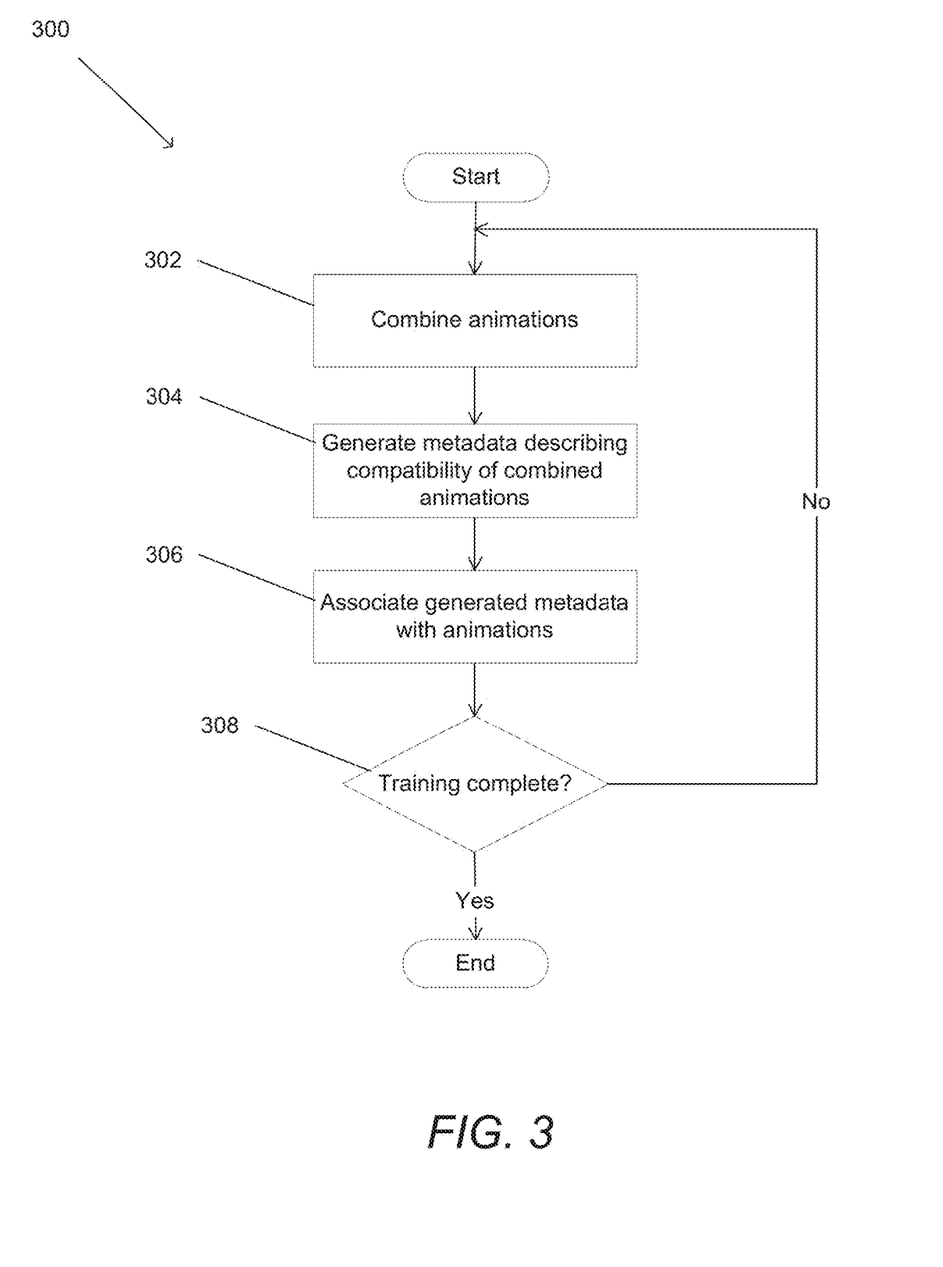
FIG. 3 is a flow chart illustrating a process for analyzing the compatibility of animations in accordance with an embodiment of the invention.

A process for analyzing the compatibility of the motion data of ordered pairs of animations in accordance with an embodiment of the invention is illustrated in FIG. 3. The process 300 includes comparing (302) a first animation with a second animation. In several embodiments, both the first and second animations are located within an animation database maintained by an animation server. In a number of embodiments, the first animation is provided by a user. In many embodiments, the first and/or second animations are synthesized by an animation server using motion models and high level descriptions of motion in the manner discussed above. In certain embodiments, the comparison is performed by scanning the end of the first animation and the start of the second animation to locate the frames that are the most similar. These frames can then be compared to determine the similarity of the frames. In several embodiments, a support vector machine is utilized to score the compatibility of the frames using a weighted least squares comparison. The weights utilized during the weighted least squares comparison are obtained by training the support vector machine using pairs of frames (or pairs of animations) that have been manually scored. In certain embodiments, the training data set includes ordered pairs of animations identified as being compatible or incompatible. In other embodiments, any of a variety of techniques can be utilized to automate the comparison of the compatibility of ordered pairs of animations.

Metadata describing the compatibility of a pair of animations can be generated (304) based upon the compatibility score generated during the comparison. The compatibility metadata can be associated (306) with the first and/or second animation within a database of animations maintained by an animation server for use in the recommendation of animations. After associating (306) the generated metadata with the relevant animations in a database of animations, a decision (308) is made as to whether all animations in the database of animations have been compared. If the training is not complete, the process selects another two animations to combine (302) and compare (304). If all of the animations in the animation database have been compared, then the process ends.

In many embodiments, the training process also includes manually building a taxonomy tree and assigning each animation to the taxonomy tree. As discussed above, a taxonomy tree is a tree constructed using terms that have a parent attribute. In several embodiments, proximity within the taxonomy tree is indicative of compatibility between animations. In a number of embodiments, traversing a taxonomy tree between two animations identifies animations that can be utilized as transition animations to generate a more realistic sequence of animations. In other embodiments, any of a variety of techniques can be used to capture the high level compatibility of categories of animations.

Although specific process for determining the compatibility of ordered pairs of animations and for generating metadata describing the compatibility of ordered pairs of animations are discussed above, any of a variety of processes can be utilized to generate metadata concerning the compatibility of pairs of animations when concatenated as appropriate to the requirements of a specific application in accordance with embodiments of the invention.

Generating Animation Recommendations

In many embodiments, an animation database stores metadata describing the compatibility of pairs of animations. The metadata can be queried to locate compatible animations. In several embodiments, the recommended animations are identified based upon a compatibility score assigned to the pair of animations using a process similar to the process described above. In embodiments that include a taxonomy tree, the recommendations can include compatible animation categories and recommendations can be made with respect to specific animations within the animation categories based upon compatibility scores. In several embodiments, selected animations are retargeted to the 3D character that is being animated. Determinations of compatibility can be made prior to retargeting the motion data. Alternatively, compatibility scores can be generated in real time by comparing the retargeted motion data.

In many embodiments, the recommendation algorithm can take a user's preference for a class of additional animation (based upon animation classification data) into consideration when recommending additional animations. In certain embodiments, a user that chooses a "walking" class of animations can receive recommendations concerning animations that a taxonomy tree indicates are related, such as a walk to stop animation, a gesturing while walking animation, or a walk to jump animation. In still other embodiments, a user that selects a swimming class of animation may have a set of animations recommended based on the taxonomy tree that are closely related to the swimming class of animations such as diving animations, a swimming to the ledge animation, or a jumping out of the water animation.

In several embodiments, specific recommendations are determined based upon a recommendation engine that updates over time as animators combine specific sequences of animations. An animation server in accordance with embodiments of the invention can also make recommendations concerning additional aspects of the 3D character animation including (but not limited to) recommending props that can be included in the animation.

Although specific processes for recommending animations are discussed above, any of a variety of processes can be utilized to recommend animations based upon any metadata generated according to the requirements of a specific application in accordance with embodiments of the invention.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. An animation server system for providing recommendations for adding animations to a sequence of animations comprising:
   at least one processor; and
   at least one non-transitory computer readable storage medium storing instructions that, when executed by the at least one processor, cause the system to:
      identify an animation sequence for a 3D character, the animation sequence comprising a first animation;
      receive a request to provide an animation recommendation that recommends at least one animation to add to the first animation in the animation sequence;
      locate a node on a taxonomy tree that matches an identified animation category of the first animation, wherein the taxonomy tree comprises a set of nodes, wherein each node represents an animation category comprising a plurality of animations, wherein each node is directly connected to at least one other node to form a logical animation transition between the directly connected nodes, and wherein traversing the taxonomy tree between two adjacent nodes results in a smooth sequence of animations;
      traverse one or more directly connected nodes on the taxonomy tree to identify one or more additional animations that result in a smooth sequence of animations when added to the first animation;
      generate a recommendation list comprising the one or more additional animations;
      provide the recommendation list to a client device associated with a user;
      receive, from the client device, a selection of an animation selected from the recommendation list; and
      concatenate the selected animation to the first animation in the animation sequence.

2. The animation server system of claim 1, wherein the instructions, when executed by the at least one processor, cause the system to identify the one or more additional animations by identifying animations that have an initial 3D motion model pose that matches a pose of the 3D character at an end of the first animation.

3. The animation server system of claim 2, further comprising instructions that, when executed by the at least one processor, cause the system to determine a compatibility score identifying a compatibility of the first animation in the animation sequence to the one or more additional animations; and
   wherein generating the recommendation list comprising the one or more additional animations further comprises generating the recommendation list ranked according to compatibility scores between the one or more additional animations and the first animation.

4. The animation server system of claim 3, wherein instructions, when executed by the at least one processor, cause the system to determine the compatibility score by comparing a similarity between the pose of the 3D character at the end of the first animation and the initial 3D motion model pose at a start of an animation from the one or more additional animations.

5. The animation server system of claim 4, wherein instructions, when executed by the at least one processor, cause the system to compare the similarity between the pose of the 3D character at the end of the first animation and the initial 3D motion model pose at the start of the animation of the one or more additional animations using a weighted least squares comparison.

6. The animation server system of claim 5, wherein instructions, when executed by the at least one processor, cause the system to determine weights in the weighted least squares comparison using a support vector machine.

7. The animation server system of claim 1, further comprising instructions that, when executed by the at least one processor, cause the system to:
   receive a selection of a second animation; and
   traverse the taxonomy tree to identify a recommended transition animation to insert between the selected animation and the second animation.

8. The animation server system of claim 7, further comprising instructions that, when executed by the at least one processor, cause the system to: insert the recommended transition animation after the selected animation in the concatenated animation sequence; and insert the second animation to the concatenated animation sequence after the recommended transition animation.

9. The animation server system of claim 1, further comprising instructions that, when executed by the at least one processor, cause the system to assign each of the one or more additional animations to corresponding nodes of the taxonomy tree based on metadata associated with each of the one or more additional animations.

10. The animation server system of claim 1, further comprising instructions that, when executed by the at least one processor, cause the system to generate a database that contains ordered pair compatibility scores between the first animation and each animation within the one or more additional animations, wherein an ordered pair of animations specifies the sequence of animation between two animations in the ordered pair of animations.

11. The animation server system of claim 1, wherein concatenating the selected animation to the first animation in the animation sequence comprises concatenating the selected animation to the first animation in the animation sequence using motion models and high level descriptions of motion.

12. The animation server system of claim 11, further comprising instructions that, when executed by the at least one processor, cause the system to customize the selected animation based upon modified high level descriptions of motion provided from the client device.

13. The animation server system of claim 1, further comprising instructions that, when executed by the at least one processor, cause the system to receive a 3D character model.

14. The animation server system of claim 13, further comprising instructions that, when executed by the at least one processor, cause the system to retarget the concatenated animation sequence to the 3D character model.

15. The animation server system of claim 1, wherein metadata for the first animation comprises a list of recommended animations that are compatible with the first animation.

16. The animation server system of claim 1, further comprising instructions that, when executed by the at least one processor, cause the system to use inverse kinematics based on metadata from the first animation and the selected animation to blend the first animation and the selected animation in the animation sequence.

17. The animation server system of claim 16, wherein the metadata for the first animation comprises:
    information about a start and end pose;
    a number of frames of the first animation;
    a global orientation of the 3D character in a first frame of the first animation;
    a global orientation of the 3D character in a last frame of the first animation;
    whether the first animation is in place or in motion; and
    whether there is any foot planting in the first animation.

18. The animation server system of claim 17, wherein the metadata for the first animation further comprises whether the 3D character in the first animation ends on a floor level, a higher level, or a lower level than at the start of the first animation.

19. An animation server system for providing animation recommendations for a sequence of animations, comprising:
    a database containing a taxonomy tree comprising a set of nodes, wherein each node represents an animation category, and wherein each node is directly connected to at least one other node to form a logical animation transition between the directly connected nodes; and
    at least one processor; and
    at least one non-transitory computer readable storage medium storing instructions that, when executed by the at least one processor, cause the system to:
    receive a 3D character model;
    identify an animation sequence for the 3D character model, the animation sequence comprising a first animation;
    receive a request to provide animation recommendations that recommend one or more animation to add to the first animation in the animation sequence;
    identify an animation category of the first animation based on metadata of the first animation in the animation sequence;
    locate a corresponding node on the taxonomy tree matching the identified animation category of the first animation;
    traverse one or more directly connected nodes on the taxonomy tree to identify one or more additional animations that result in a smooth sequence of animations when added to the first animation;
    generate a recommendation list comprising the one or more additional animations;
    receive a selection of a recommended animation selected from the one or more additional animations;
    concatenate the selected animation to the first animation in the animation sequence; and
    retarget the concatenated animation sequence to the 3D character model based on the concatenation.

20. A method of generating a sequence of animations comprising:
    receiving a 3D character model;
    identifying, by at least one processor, an animation sequence for the 3D character model, the animation sequence comprising a first animation;
    maintaining a taxonomy tree comprising a set of nodes, wherein each node represents an animation category comprising a plurality of animations, wherein each node is directly connected to at least one other node to form a logical animation transition between the directly connected nodes, and wherein traversing the taxonomy tree between two adjacent nodes results in a smooth sequence of animations;
    receiving a request to provide an animation recommendation that recommends one or more animations to add to the first animation in the animation sequence;
    identifying an animation category of the first animation based on metadata of the first animation in the animation sequence;
    locating a corresponding node on the taxonomy tree matching the identified animation category of the first animation;
    traversing one or more directly connected nodes on the taxonomy tree to identify one or more additional animations that result in a smooth sequence of animations when added to the first animation;
    generating a recommendation list comprising the one or more additional animations;
    receiving a selection of a recommended animation selected from the one or more additional animations;
    concatenating the selected animation to the first animation in the animation sequence; and
    retargeting the concatenated animation sequence to the 3D character model based on the concatenation.

* * * * *